(12) United States Patent
Velasco et al.

(10) Patent No.: US 11,348,482 B2
(45) Date of Patent: May 31, 2022

(54) INANIMATE MODEL FOR LAPAROSCOPIC REPAIR

(71) Applicant: Rush University Medical Center, Chicago, IL (US)

(72) Inventors: Jose M. Velasco, Chicago, IL (US); Aleksandra Wojtowicz, Mount Prospect, IL (US)

(73) Assignee: RUSH UNIVERSITY MEDICAL CENTER, Chicago, IL (US)

( * ) Notice: Subject to any disclaimer, the term of this patent is extended or adjusted under 35 U.S.C. 154(b) by 458 days.

(21) Appl. No.: 16/320,380

(22) PCT Filed: Jul. 21, 2017

(86) PCT No.: PCT/US2017/043244
§ 371 (c)(1),
(2) Date: Jan. 24, 2019

(87) PCT Pub. No.: WO2018/022443
PCT Pub. Date: Feb. 1, 2018

(65) Prior Publication Data
US 2019/0236986 A1 Aug. 1, 2019

Related U.S. Application Data

(60) Provisional application No. 62/366,353, filed on Jul. 25, 2016.

(51) Int. Cl.
*G09B 23/28* (2006.01)
*G09B 23/34* (2006.01)
(Continued)

(52) U.S. Cl.
CPC ........... *G09B 23/34* (2013.01); *G09B 9/00* (2013.01); *G09B 23/28* (2013.01); *G09B 23/30* (2013.01); *G09B 23/32* (2013.01)

(58) Field of Classification Search
CPC .................... G09B 23/28; G09B 23/30
(Continued)

(56) References Cited

U.S. PATENT DOCUMENTS 5,620,326 A 4/1997 Younker
5,908,302 A * 6/1999 Goldfarb ............ G09B 23/28
434/262

(Continued)

FOREIGN PATENT DOCUMENTS

CN 1237749 A 12/1999
WO WO 93/21619 A1 10/1993

OTHER PUBLICATIONS

"Abdominal Key: Surgical Anatomy of the Esophageal Hiatus". (Year: 2017).*

(Continued)

*Primary Examiner* — Kurt Fernstrom
(74) *Attorney, Agent, or Firm* — Barnes & Thornburg LLP

(57) ABSTRACT

An inanimate model for surgical simulation and methods for making and using the model are provided. The model includes a simulated diaphragm, a simulated esophagus extending through an esophageal opening in the diaphragm, a simulated blood vessel extending through a blood vessel opening in the diaphragm, and a simulated hernia in the diaphragm.

4 Claims, 6 Drawing Sheets

(51) Int. Cl.
  *G09B 9/00* (2006.01)
  *G09B 23/32* (2006.01)
  *G09B 23/30* (2006.01)

(58) Field of Classification Search
  USPC ............................... 434/262, 267, 268, 272
  See application file for complete search history.

(56) References Cited

U.S. PATENT DOCUMENTS

| | | | |
|---|---|---|---|
| 6,960,233 B1 | 11/2005 | Berg et al. | |
| 10,796,606 B2* | 10/2020 | Felsinger ............... | G09B 23/34 |
| 2003/0031993 A1* | 2/2003 | Pugh ....................... | G09B 23/30 |
| | | | 434/262 |
| 2009/0311662 A1* | 12/2009 | Ramphal .............. | G09B 23/288 |
| | | | 435/1.1 |
| 2010/0167248 A1 | 7/2010 | Ryan | |
| 2010/0209899 A1* | 8/2010 | Park ....................... | G09B 23/34 |
| | | | 434/272 |
| 2010/0311025 A1* | 12/2010 | Everett .................. | G09B 23/30 |
| | | | 434/262 |
| 2013/0108999 A1* | 5/2013 | Gillies ................... | G09B 23/28 |
| | | | 434/272 |
| 2013/0177890 A1* | 7/2013 | Sakezles ................ | G09B 23/34 |
| | | | 434/272 |
| 2014/0272879 A1 | 9/2014 | Shim et al. | |
| 2014/0329217 A1* | 11/2014 | Bareness .............. | G09B 23/285 |
| | | | 434/272 |
| 2014/0342334 A1 | 11/2014 | Black et al. | |
| 2015/0187229 A1* | 7/2015 | Wachli .................. | G09B 23/285 |
| | | | 434/272 |
| 2015/0371558 A1* | 12/2015 | Katayama ............ | G09B 23/285 |
| | | | 434/272 |
| 2017/0186340 A1* | 6/2017 | Ogawa .................... | B32B 5/245 |
| 2018/0308394 A1* | 10/2018 | Segall .................... | G09B 23/28 |
| 2019/0090969 A1* | 3/2019 | Jarc ....................... | A61B 90/361 |

OTHER PUBLICATIONS

Veenstra et al.; "Inanimate Model for Laparoscopic Repair of Diaphragmatic Hernia"; Poster presented at the Society of American Gastrointestinal and Endoscopic Surgeons (SAGES) on Jan. 4, 2016; 4 pages.
International Preliminary Report on Patentability for PCT/US2017/043244 dated Jan. 29, 2019.
Written Opinion for PCT/US2017/043244 completed Sep. 6, 2017.
International Search Report for PCT/US2017/043244 completed Sep. 5, 2017.
Office Action issued in corresponding JP Application No. 2019-503659, dated Jul. 20, 2021.
Tortora et al., "Structure and Function of Human Body," Principles of Anatomy and Physiology, Maruzen Co., Ltd., 2nd ed., (2007), pp. 363 and 365.

* cited by examiner

INANIMATE MODEL FOR LAPAROSCOPIC REPAIR

RELATED APPLICATIONS

This application claims the benefit under 35 U.S.C. § 371 of International Application No. PCT/US2017/043244, filed Jul. 21, 2017, which claims the benefit of U.S. Provisional Application No. 62/366,353, filed Jul. 25, 2016, which applications are incorporated by reference herein in their entirety.

FIELD OF THE INVENTION

This application relates to an inanimate model and methods for training for surgery, and in particular, to an inanimate model and method for training for surgical repair of a hernia.

BACKGROUND

The training of surgical residents to technical proficiency is at the core of surgical residency programs. However, new work hour regulations have made it increasingly challenging to train residents in a five year period. Many residents seek additional training through fellowship programs, suggesting a void in the current model. Within this void, there is a need to practice and develop the skills necessary for complex laparoscopic, albeit institutionally low volume cases, as simple observation does not suffice. To answer the question of how to fill this void, many institutions are looking towards surgical simulation, particularly the use of laparoscopic trainers. However, most laparoscopic trainers are expensive and their value is only beginning to be established.

What is needed is a tactile model of advanced, yet low volume laparoscopic cases to afford residents a more realistic opportunity to gain operative exposure, technique and skill. The skill acquired during the tactile simulation will allow residents to take full advantage of the low volume laparoscopic cases when encountered in the OR, and not be wasted on observation alone.

BRIEF SUMMARY

In one aspect, an inanimate model for surgical simulation is provided. The model includes a simulated diaphragm, a simulated esophagus extending through an esophageal opening in the diaphragm, a simulated blood vessel extending through a blood vessel opening in the diaphragm, and a simulated hernia in the diaphragm.

In another aspect, a method of simulating a laparoscopic repair of a hernia using a model is provided. The method includes performing a surgical repair of a hernia in a simulated model. The simulated model includes a simulated diaphragm, a simulated esophagus extending through an esophageal opening in the diaphragm, a simulated blood vessel extending through a blood vessel opening in the diaphragm, and a simulated hernia in the diaphragm.

In yet another aspect, a method of making a model for surgical simulation is provided. The method includes providing a simulated diaphragm having an esophageal opening, a blood vessel opening and a hernia in the diaphragm, providing a simulated esophagus and extending the simulated esophagus through the esophageal opening in the diaphragm and providing a simulated blood vessel and extending the simulated blood vessel through the blood vessel opening in the diaphragm

DETAILED DESCRIPTION OF THE EMBODIMENTS

Figure 1:
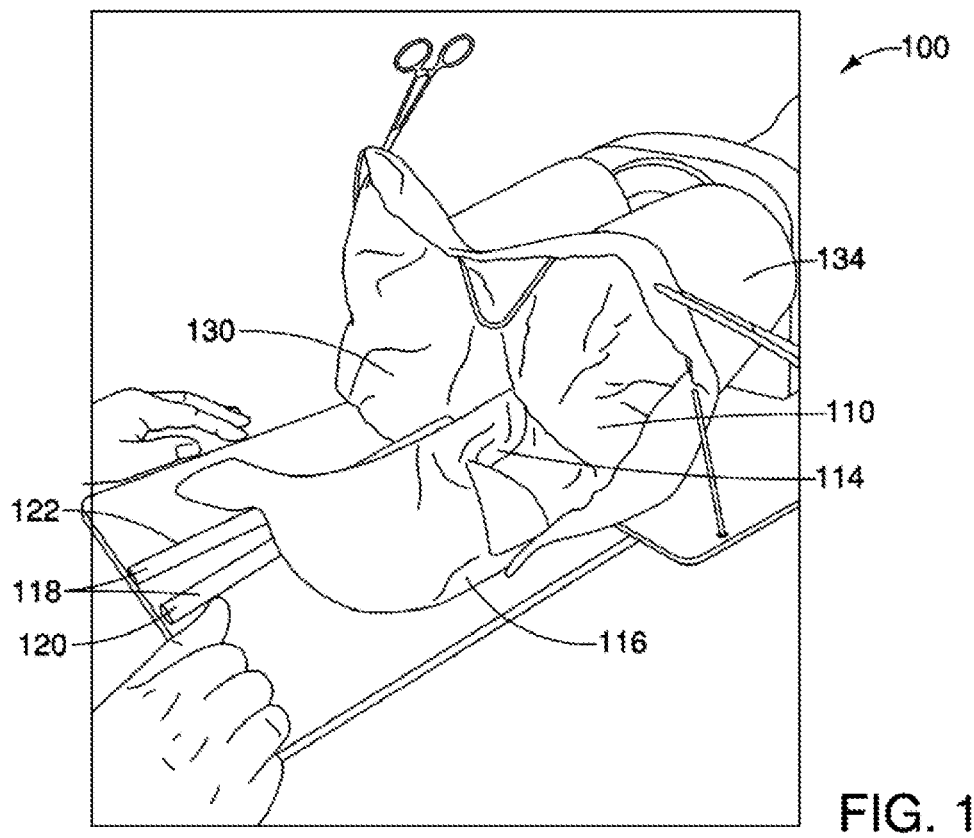
FIG. 1 is a perspective view of a portion of an embodiment of an inanimate model in accordance with the present invention.

The invention is described with reference to the drawings in which like elements are referred to by like numerals. The relationship and functioning of the various elements of this invention are better understood by the following detailed description. However, the embodiments of this invention are not limited to the embodiments illustrated in the drawings. It should be understood that the drawings are not to scale, and in certain instances details have been omitted which are not necessary for an understanding of the present invention, such as conventional fabrication and assembly.

Figure 2:
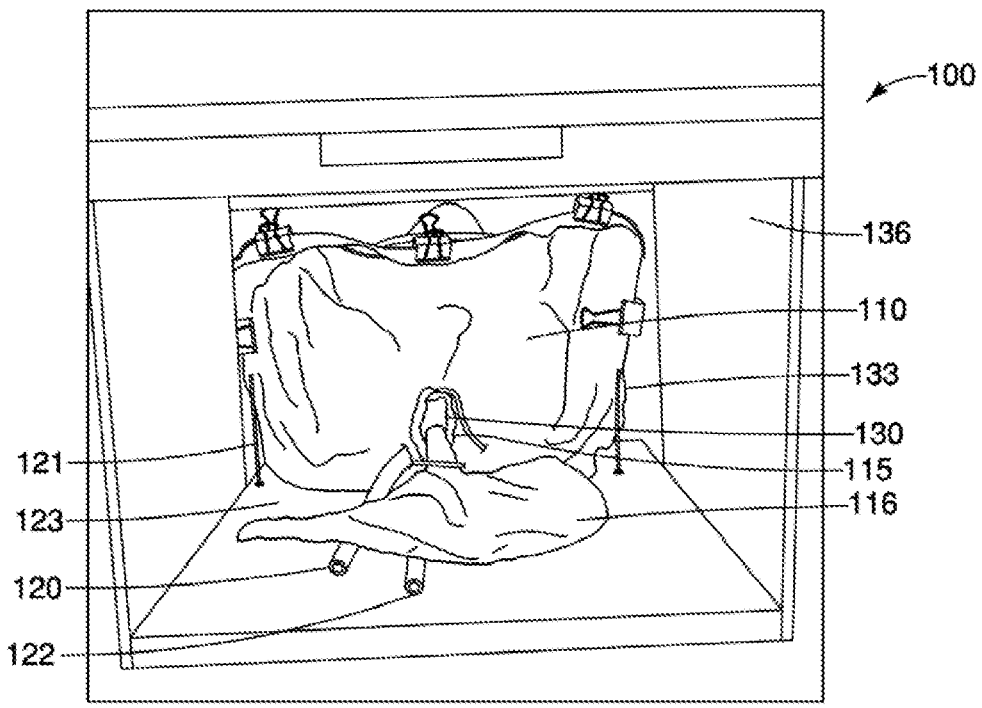
FIG. 2 is an end view of an embodiment of the model showing a diaphragm in a lumen.
Figure 3:
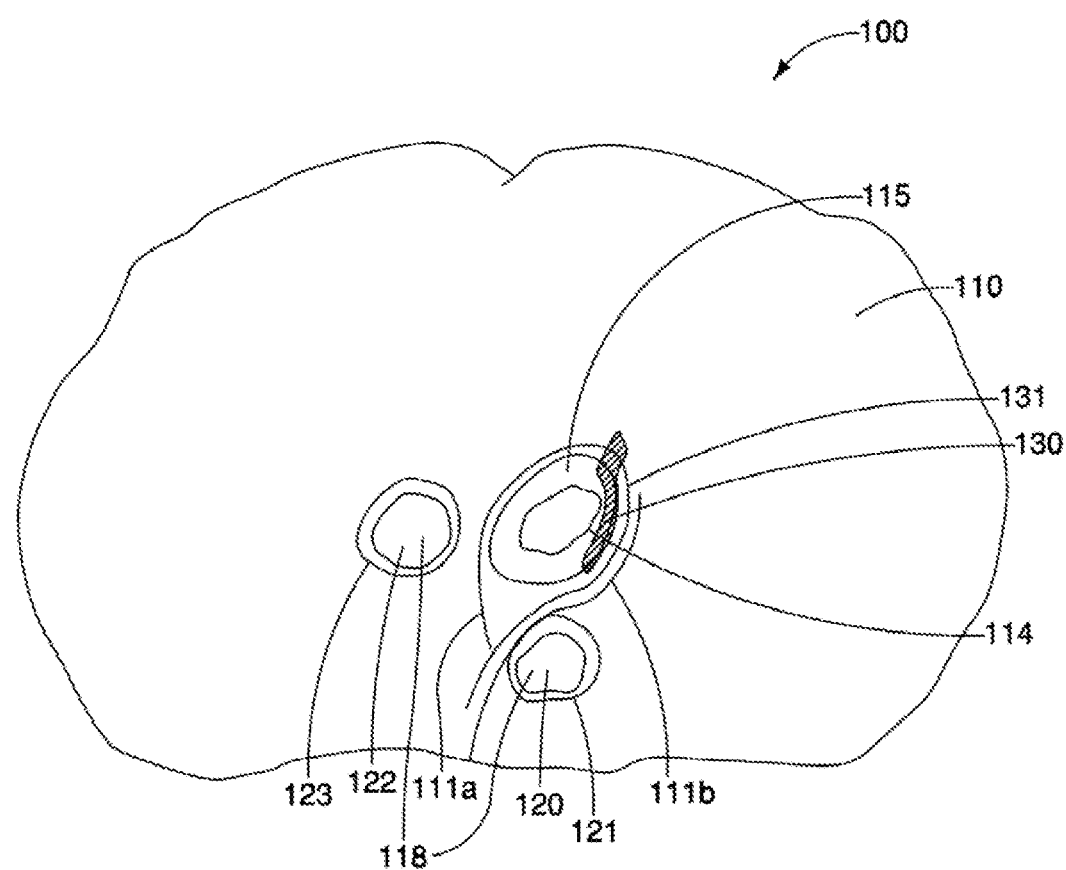
FIG. 3 illustrates a simulated diaphragm of an embodiment of the model.

FIGS. 1 and 2 illustrate embodiments of an inanimate model 100 that may be used for training, for example for surgical repair of a hernia. In some embodiments, the model 100 may be used for laparoscopic repair of a diaphragmatic hernia. The model 100 may include a diaphragm 110, an esophagus 114, a stomach 116, and one or more blood vessels 118, for example, an aorta 120 and a vena cava 122. The esophagus 114 extends through an esophageal opening 115 in the diaphragm 110 that includes left and right diaphragmatic crura 111a, 111b (Shown in FIG. 3). The blood vessels 120, 122 each extend through their own opening 121, 123, respectively, in the diaphragm 110 as shown in FIGS. 2 and 3. In some embodiments, the anatomical portions of the model 100 may be textured and pigmented to resemble the anatomical portions of the patient. By way of non-limiting example, the diaphragm 110, esophagus 114 and the stomach 116 may be pigmented to resemble the color of muscle. In some embodiments, the aorta 120 may have a red color and the vena cava 122 may have a blue color.

The model 100 also includes a hernia 130 in the diaphragm 110. The hernia 130 may be a tear anywhere in the diaphragm 110 that represents any type of traumatic or congenital hernia. By way of non-limiting example, the traumatic hernias may be the result of an increased pressure within the cavity, a car accident, an explosion or any other trauma that results in a tear in the diaphragm. An exemplary esophageal hiatus 130 is shown in FIGS. 2 and 3 where the stomach migrates inside the chest through the tear in the diaphragm 110 near the esophageal opening 115. One skilled in the art will understand that the model 100 may include tears anywhere in the diaphragm 110 that correspond to known diaphragmatic hernias. In some embodiments, the hernia 130 may be a congenital hernia such as a Morgagni hernia or a Bochdalek hernia.

The diaphragm 110, the esophagus 114, at least one blood vessel 118 and the hernia 130 or multiple hernias that may be positioned anywhere on the diaphragm 110 provide the basic model 100 that may be used as the training tool for surgical repair of the diaphragmatic hernia. The diaphragm 110 may be sized and shaped to resemble an adult patient or a pediatric patient. In some embodiments, the diaphragm 110 may be sized and shaped to resemble other than a human patient, for example a veterinary patient. The model 100 may be positioned so that the diaphragm 110 is oriented to correspond to a patient laying on his/her back as shown in FIGS. 1 and 2. The model 100 may also be oriented in other positions that mimic possible surgical positions for the patient so that the physician can access the hernia in need of repair. Additional simulated anatomical portions and operating room features may also be included in the model 100 as described herein. In some embodiments, the proportions of the model 100 are made to simulate an adult, pediatric or veterinary patient.

Figure 4:
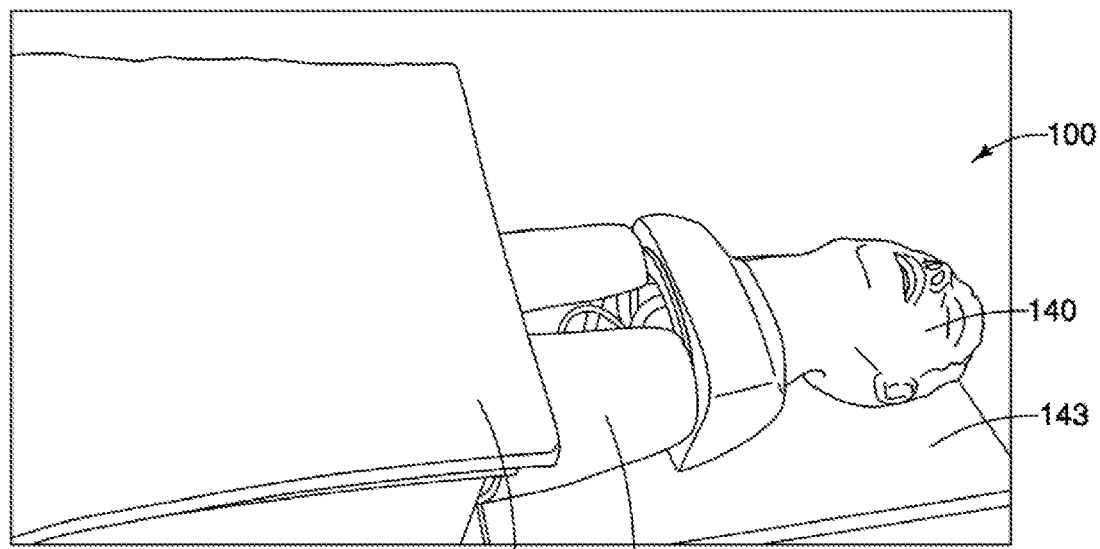
FIG. 4 illustrates an exterior view of an embodiment of the model.
Figure 5:
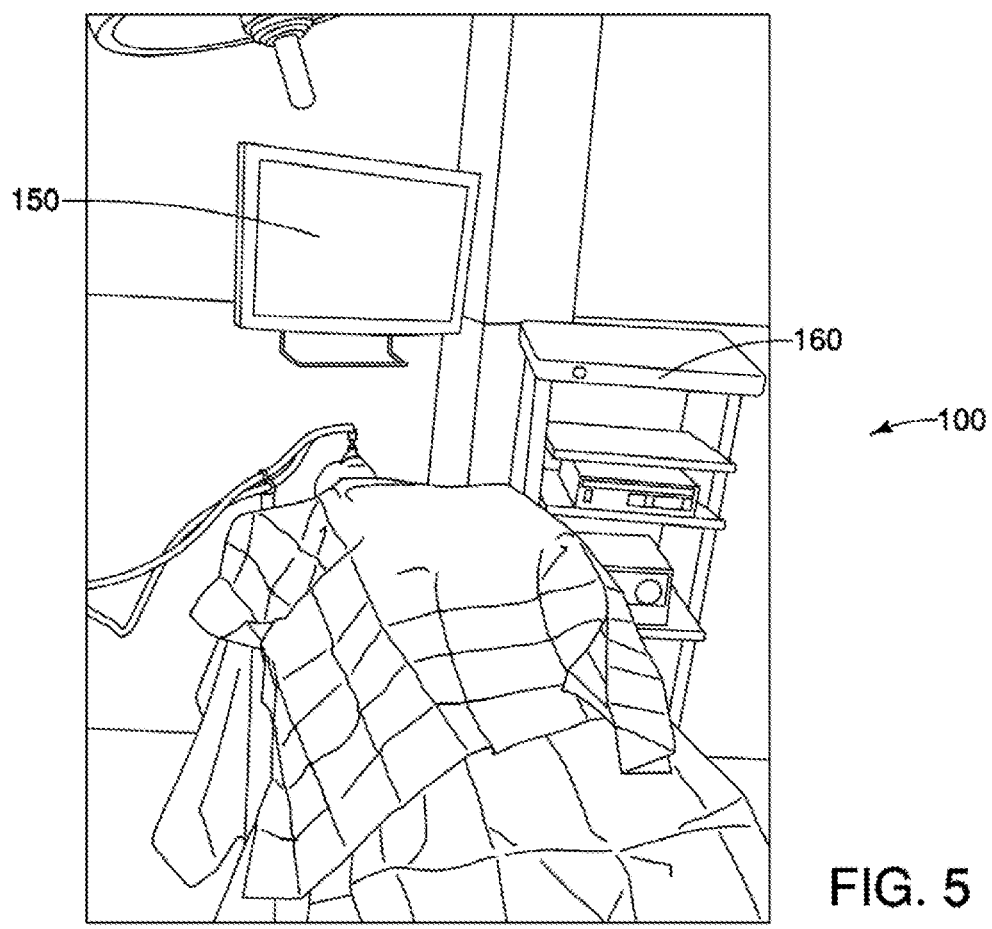
FIG. 5 illustrates an embodiment of the model in a surgical setting.
Figure 6:
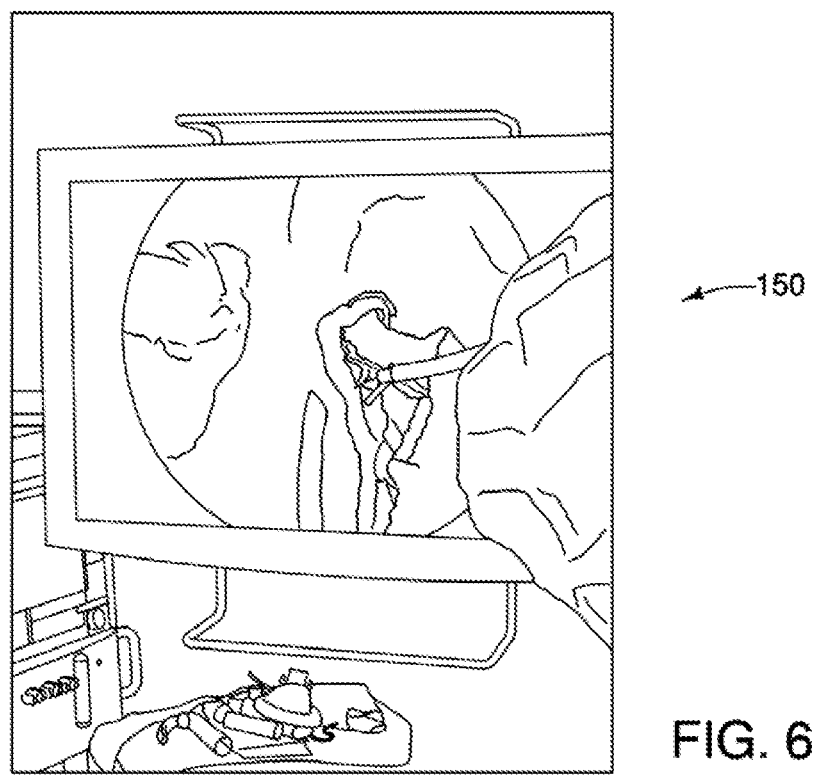
FIG. 6 illustrates a video monitoring system of an embodiment of the model.
Figure 7:
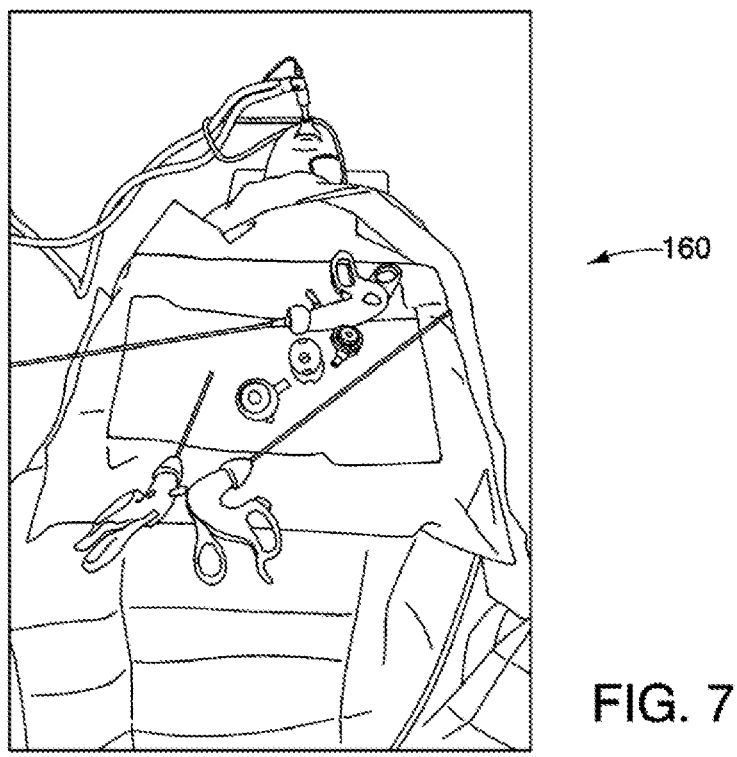
FIG. 7 illustrates surgical instruments for use with the model of embodiments of the present invention.

In some embodiments, the model may also include lungs 134 as shown in FIG. 1 and a walled structure 136 that may represent a luminal wall as shown in FIGS. 2 and 4. The lungs 134 may be connected to an airway model optionally including a head 140 as shown in FIG. 4, for example similar to an airway "dummy" used for intubation practice. FIG. 2 shows a view of the model 100 looking into a lumen 133 with the diaphragm 110 positioned within the luminal wall 136. FIG. 4 illustrates a top view the model 100 from outside the luminal wall 136. FIG. 5 illustrates an embodiment of the model 100 prepared for surgery, similar to a set up that would be provided in an operating room with the model 100 covered, intubated and with an imaging system 150 and surgical instruments 160 positioned near an operating table on which the model 100 is positioned in a prone position. The surgical instruments 160 provided also simulate the instruments needed to complete the surgical repair. FIG. 6 illustrates a view of the completed procedure on the imaging system 160 and FIG. 7 illustrates surgical instruments 160 that were used during the procedure that is described in more detail below.

The model 100 may be manufactured by assembling together some or all of the components described above. Portions of the model 100 may be molded or formed separately and then assembled together. The materials used to form portions of the model, such as the diaphragm, esophagus, stomach and blood vessels are selected to be flexible to allow the portions of the model 100 to be moved relative to each other and to allow for closure of the hernia by surgical methods such as suturing or stapling. Portions of the model, such as the luminal wall are formed from materials that are more rigid to simulate more rigid anatomical structures of the patient. An exemplary method of manufacturing the model 100 is provided. However, one skilled in the art will understand that other methods may also be used.

Figure 8:
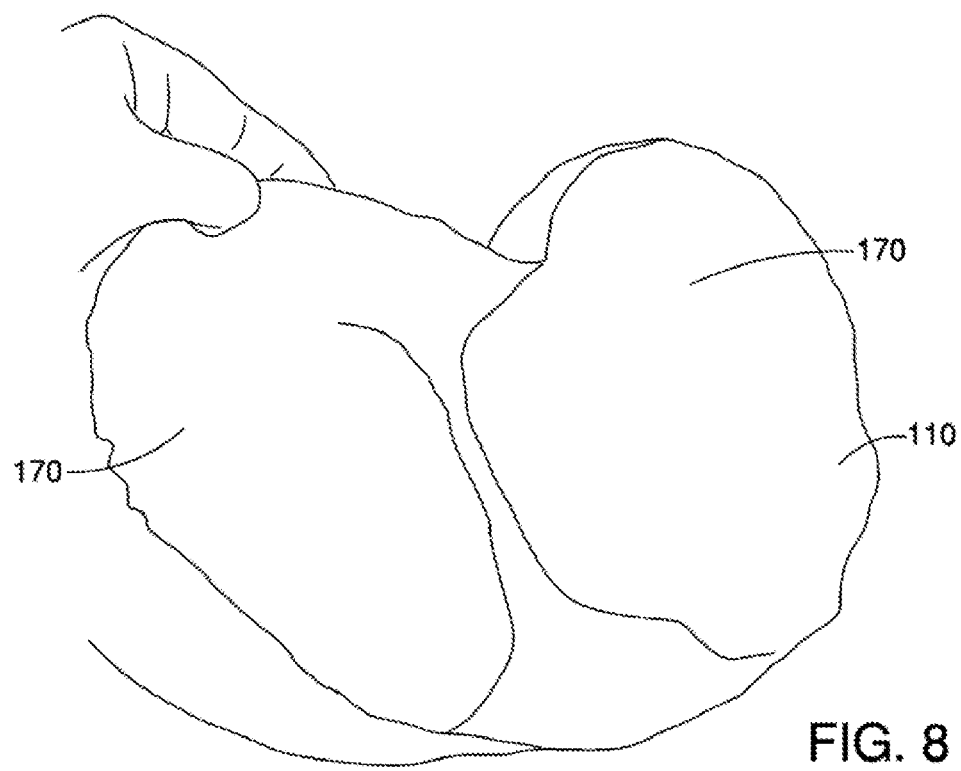
FIG. 8 illustrates a simulated diaphragm of an embodiment of the model.

FIG. 8 shows a molded diaphragm 110 that includes the curvatures 170 that are found in a normal adult or pediatric diaphragm. In some embodiments, the diaphragm 110 may be molded on a form/mandrel having the curvatures 170. In some embodiments, the curvatures 170 may be formed by two balloons where the balloons are inflated and taped together. The balloons are then molded using plaster paper to form the curvatures 170 for the diaphragm 110. Once the plaster paper mold over the balloons is dried, a layer of XTC-3D® coating is added to seal the mold and dried overnight, about 12-24 hours. A layer Dragon Skin® 10 FAST Silicone is spread out over the mold as a base layer for the diaphragm 110 that adds muscle-like pigment and thickener. Before the silicone layer is completely cured, mesh strips are added all over the diaphragm 110 and the diaphragm is finished with an additional layer of Dragon Skin® 10 FAST Silicone and dried overnight. Once the diaphragm 110 has cured, openings may be cut out, for example for the hernia 131, the esophageal opening 115, the aorta opening 121 and the vena cava opening 123. The exemplary hiatal hernia 130 may be formed as an enlarged opening 131 at the esophageal opening 115.

The stomach 116 may be prepared using Ecoflex® Silicone. A layer of Ecoflex® Silicone may be poured out into a tray, pigment added to resemble muscle color and cured. The shape of a stomach may be cut out from the cured mold or the tray may be shaped to resemble the shape of an adult or pediatric stomach. Edges of the cutout stomach shape may be sutured together.

The vessels 118 may be formed using an appropriately sized dowel. With the dowel connected to an electrical screw, Dragon Skin® 10 VERY FAST Silicone with the correct pigment added is poured over the rotating dowel. A piece of mesh is added and the vessel is finished off by pouring another layer of pigmented, thickened Dragon Skin® 10 VERY FAST Silicone over the layers. The vessels are cured for about two hours or longer.

Figure 9:
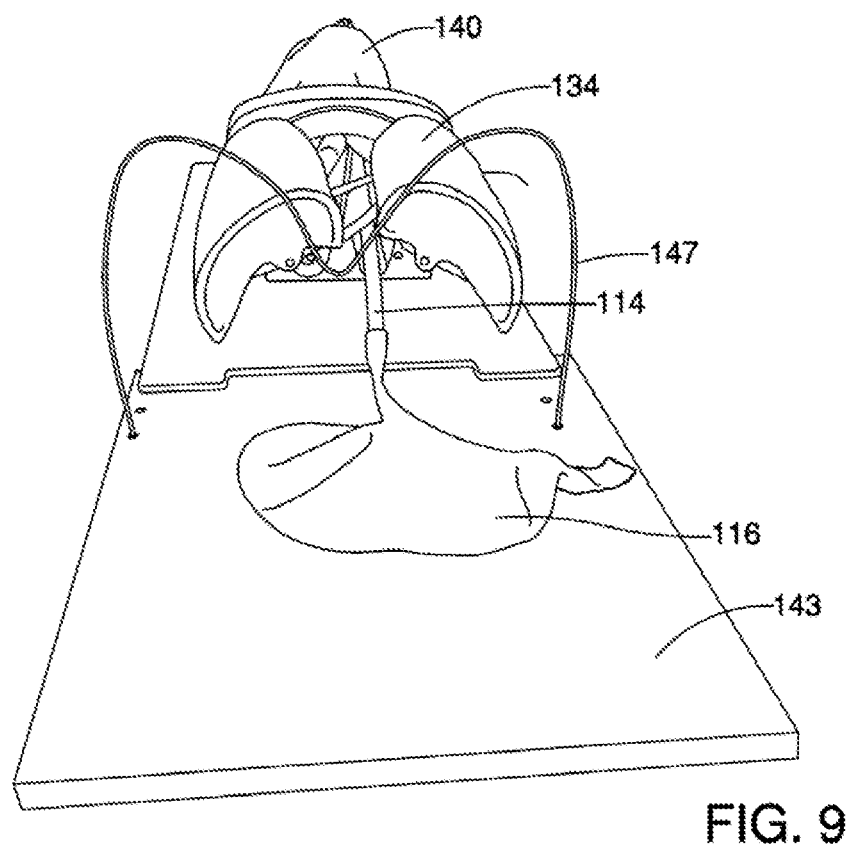
FIG. 9 illustrates assembly of an embodiment of the model.

After preparing the portions of the model 100 described above, the model 100 may be assembled as follows. An intubation head 140 with lungs 134 connected is positioned on a board 143 as shown in FIG. 9. A wire 147 is provided in the shape of the diaphragm 110 and secured to the board 143. The stomach 116 is attached to the esophagus 114 extending from the intubation head 140 and lungs 134. The esophagus 114 may be lengthened as needed using tubing. The diaphragm 110 is attached to the frame 147 and the stomach 116 and esophagus 114 are extended through the diaphragm 110 at the hernia 130, for example when the model 100 is for a diaphragmatic hernia. A portion of the stomach 116 may extend through the hernia 130. The vena cava 122 and the aorta 120 are extended through openings 123, 121, respectively and secured. A portion of the stomach 116 may also be secured to the board. Side and top boards are added to complete the box representing the luminal wall 136 over the diaphragm 110. A layer of Ecoflex® Silicone and Ecoflex® Gel may be positioned over an opening to the box to simulate skin and fatty tissue. The model 100 is then draped with a surgical drape and ready for the surgical simulation as shown in FIG. 5.

Figure 10:
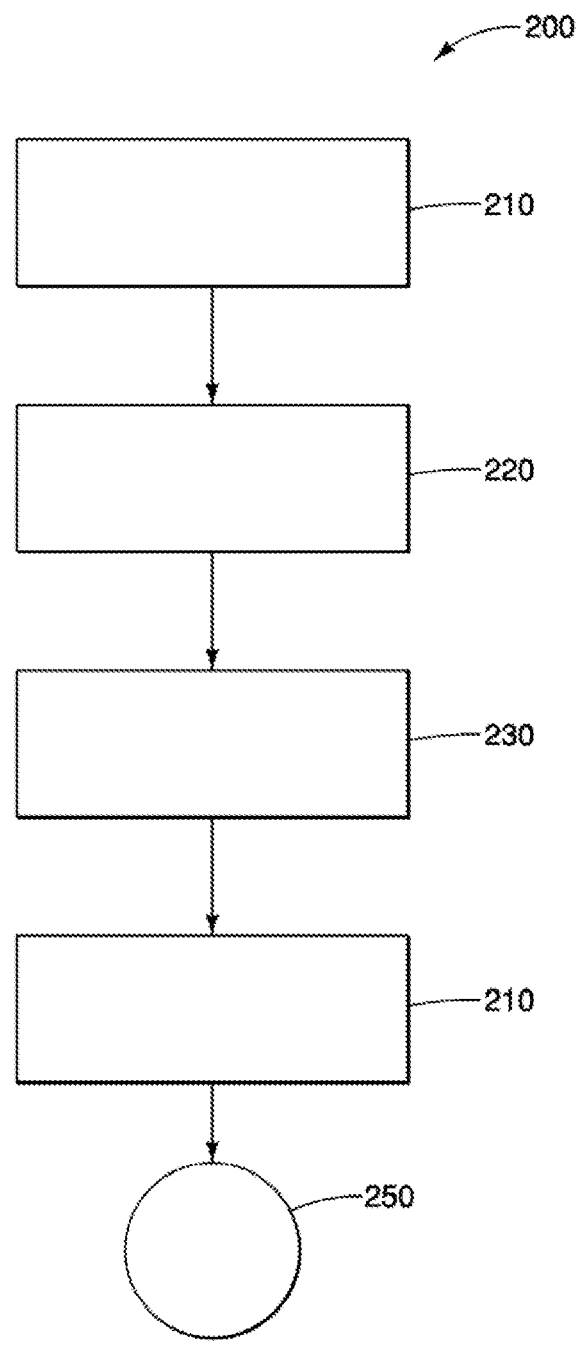
FIG. 10 illustrates an example procedure that may be performed on the model.

The model 100 may be used for individual training, for example, with the model 100 in an operating room setting, in a class room, or at home and with or without an imaging system to view the procedure. The individual can practice the steps of the procedure as many times as needed using the model 100. The steps of the procedure to be practiced may be different depending on the different type of hernia that is included in the model. FIG. 10 illustrates an exemplary procedure that may be performed on the model 110, showing a plurality of steps 210, 220, 230, 240 and an evaluation 250. In some embodiments, each step may be evaluated as the step is completed and in other embodiments, the evaluation may be completed after a group of steps or all of the steps have been completed. By way of non-limiting example, the steps for the procedure to laparoscopically repair a diaphragmatic hernia may include the following: 1. Pull the stomach 116 in the luminal cavity 133 (210); 2. Close the diaphragmatic crus 111 (220); 3. Create a fundoplication (230); and 4. Peel the sac off (240). Evaluation of the trainee is shown at step 250 of FIG. 10.

In some embodiments, the model 100 may be used for team training, for example to train residents and nurses that will be working together in the operating room. The model 100 can be set up to teach conditions and complications of the laparoscopic repair. By way of non-limiting example, the model 100 may include bleeding, decreased blood pressure and/or cardiac arrest that can occur during the laparoscopic repair.

It is therefore intended that the foregoing detailed description be regarded as illustrative rather than limiting, and that it be understood that it is the following claims, including all equivalents, that are intended to define the spirit and scope of this invention.

The invention claimed is:

1. A method of simulating a laparoscopic repair of a hernia using a model, the method comprising:
   performing a surgical repair of a hernia in a simulated model, the simulated model including:
   a simulated diaphragm;
   a simulated esophagus extending through an esophageal opening in the diaphragm;
   a simulated blood vessel extending through a blood vessel opening in the diaphragm; and
   a simulated hernia in the diaphragm;
   the surgical repair, comprising pulling a simulated stomach into a luminal cavity through the simulated hernia;
   closing a diaphragmatic crus; creating a fundoplication and peeling off a sac.

2. The method according to claim 1, further comprising performing an evaluation of the surgical repair.

3. The method according to claim 1, further comprising viewing the surgical repair on a video monitoring system.

4. The method according to claim 1, comprising repairing a traumatic hernia or a congenital hernia.

* * * * *